April 20, 1926.
J. L. SCHMIDT
SELF HEATING SADIRON
Filed June 2, 1925
1,581,327
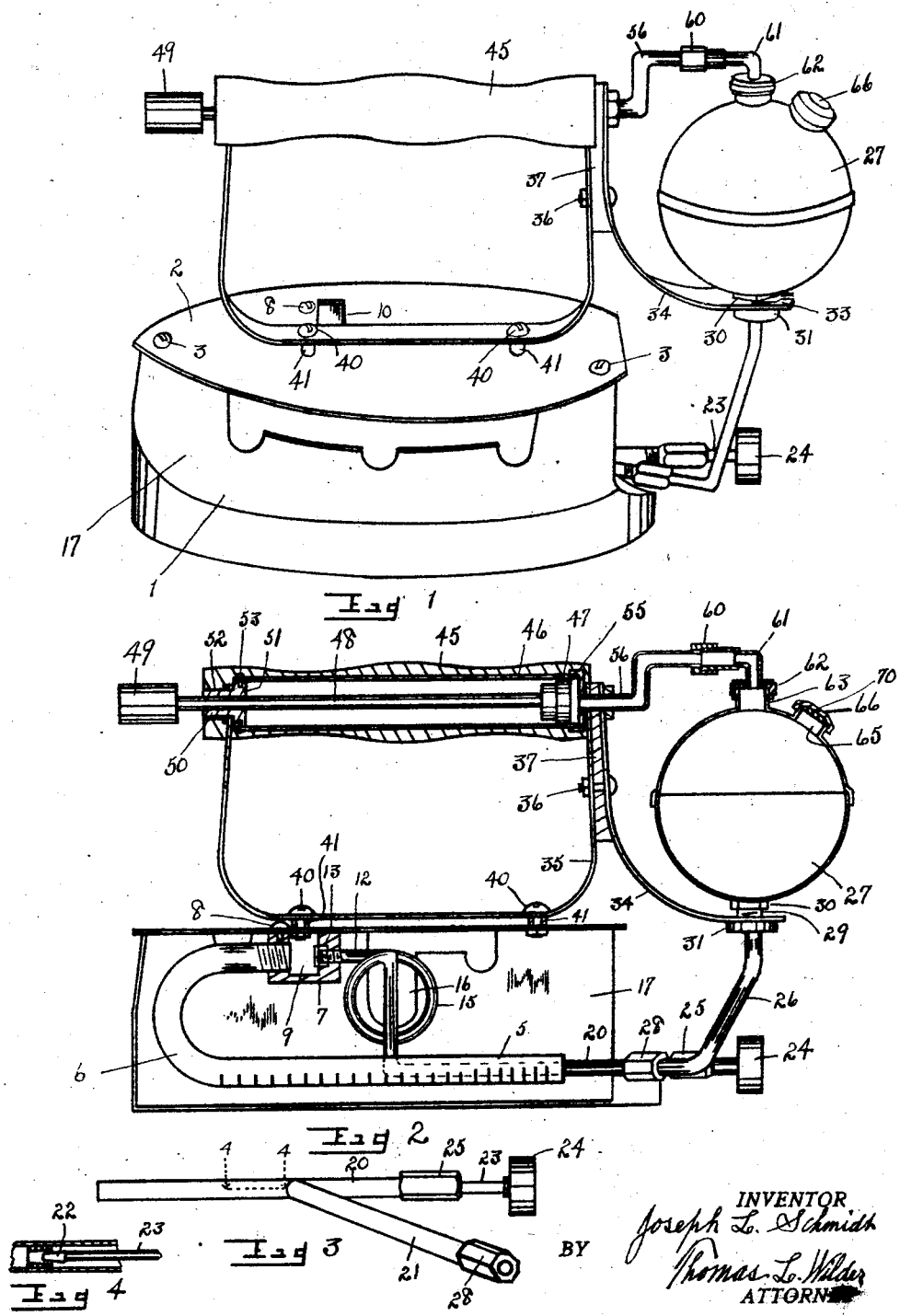

Patented Apr. 20, 1926.

1,581,327

UNITED STATES PATENT OFFICE.

JOSEPH L. SCHMIDT, OF BLOSSVALE, NEW YORK.

SELF-HEATING SADIRON.

Application filed June 2, 1925. Serial No. 34,450.

*To all whom it may concern:*

Be it known that I, JOSEPH L. SCHMIDT, a citizen of United States, residing at Blossvale, in the county of Oneida and State of New York, have invented certain new and useful Improvements in Self-Heating Sadirons, of which the following is a specification, reference being had therein to the accompanying drawing.

My invention relates to a self-heating sad iron and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a self-heating sad iron that can burn a combustible fuel such as gasoline or kerosene. In such an iron there is a pressure tank adapted to force the fuel through the burner in a spray. The present invention is designed to permit the user to pump air from time to time as needed into the pressure tank with one hand while ironing with the other.

The object will be understood by referring to the drawings, in which:

Fig. 1 is a perspective view of the device;

Fig. 2 is a central vertical section of the device; showing parts in full.

Fig. 3 is a detail perspective view of certain pipes;

Fig. 4 is a sectional view somewhat enlarged and taken on the line 4, 4 of Fig. 3.

Referring more particularly to the drawings, the device embodies a hollow casing 1 having a smooth nickel plated surface on the bottom adapted for ironing purposes. A cover plate 2 is attached by screws 3 to casing 1. A burner tube 5 having a bend at 6 is screw mounted at one end to a casing 7 held by screw 8 to cover plate 2. Casing 7 is recessed at 9. A similar recess 10 being made to aline therewith in cover plate 2. The end of burner tube 5 opens into recess 9 of casing 7. Directly opposite the location of the open end of burner tube 5 is situated the end of another tube 12 having a cap 13 with a very fine pin hole therein screw mounted thereto. Tube 12 extends rearwardly and is wound in a coil at 15. Coil 15 is located opposite an opening 16 made in the side wall 17 of casing 1. The end of tube 12 is united in a permanent manner to a pipe 20 having a branch pipe 21 disposed at an angle thereto and opening into pipe 20.

A valve 22 is mounted in pipe 20 at the location of the junction of branch pipe 21, which valve is controlled by a stem 23 having an annular handle 24 for turning said stem. A gland or nut 25 is screw threaded to the end of pipe 20 to prevent leakage.

Branch pipe 21 is connected by a tube 26 with the lower end of the spherical shaped reservoir 27. A nut 28 is screw mounted on the end of pipe 21 to prevent leakage at the junction. The opposite end of tube 26 is enlarged at 29 and screw threaded for mounting to a corresponding socket formed in the lower surface of reservoir 27. A nut 30 is employed to lock the end of tube 26 in said socket. There is mounted also on enlarged part 29 an annular boss 31 having a serrated outer peripheral surface to aid in turning the same and a central screw threaded aperture for mounting on the enlarged part 29 of tube 26, whereby to hold in place the bifurcated end 33 of bracket 34. Bracket 34 is attached to U shaped bracket 35 by a bolt 36, being separated therefrom by asbestos 37 to prevent conduction of heat. U shaped bracket 35 is mounted to cover plate 2 by screw bolts 40, spacing sleeves 41, 41 being employed to separate said bracket 35 from the top surface of plate 2.

The parts hereinabove described are old and well known in the art. The parts that are new, however, embody a rubber asbestos or fabric handle 45 shaped in such manner to adapt it for grasping by the hand to work the flat iron. Handle 45 is hollow for the reception of metal cylinder 46 containing a piston 47 attached to a piston rod 48 having an annular wooden or fabric handle 49 on the free end thereof. Cylinder 46 is closed at one end by metal member 50 having a disk part 51 to fit the end of cylinder 46 and a threaded extension 52. An aperture is made through member 50 for the sliding reception of piston rod 48. Disk part 51 is fixed to cylinder 46 by rivetes 53 or in any other suitable manner. The opposite end of cylinder 46 is closed by cap 55 having an aperture for screw mounting the end of tube 56. Cap 55 is brazed or otherwise secured in a permanent manner to cylinder 46.

Cylinder 46 is supported by the upper ends of U shaped bracket 35, which ends are equipped with holes for the projection of extension 52 of member 50 and tube 56 respectively.

Tube 56 is united by a union coupler 60 with another tube 61 that is attached to a cap 62 screw threaded to the corresponding threads of mouth member 63 of reservoir 27. Reservoir 27 has also an inlet port 65 into which is poured the gasoline or other liquid fuel used. A cap 66 is screw threaded to the mouth piece of port 65, whereby to close the same. A rubber or fabric gasket or disk 70 being disposed in said cap 66 to make an air tight fit.

The operation of the invention is effected by pouring gasoline into reservoir 27 through port 65 until the same is nearly filled and by then pumping air into reservoir 27 by means of pump handle 49. An alcohol torch not shown, is then thrust into casing 1 through opening 16 made in wall 17 and ignited, whereby to act as a burner to heat coil 15 of tube 12 and thereby vaporizing the fuel that has been admitted to tube 12, valve 22 having been opened in the meantime. The vaporized gasoline will be forced by the pressure created in reservoir 27 through tube 26 to branch pipe 21 to tube 12 and out through cap 13 towards opening 16 in burner tube 5. As the fuel is forced across the recess 10 into burner tube 5 air will be sucked along therewith to further vaporize the fuel which will be ignited as it comes out of the narrow slots formed on the under side of burner tube 5 and along the upper surface of the bottom part of casing 1, whereby to heat the same for ironing purposes. As the fuel diminishes in reservoir 27 and the pressure thereby grows less, the pressure may be increased from time to time by actuating pump or piston handle 49 with one hand while still ironing with the other.

Having thus described my invention what I claim as new and desire to secure by Letters Patent is:

1. In a self-heating sad iron, a burner, a reservoir for containing a fuel to be supplied to said burner, a handle of non-heat conducting material for actuating said iron, a U shaped bracket for supporting said handle, a second bracket attached to the U shaped bracket to aid in supporting said reservoir, a non-heat conductor between said brackets, and a pump located in said handle, whereby to create a pressure in said reservoir.

2. In a self-heating sad iron, a burner, a reservoir for supplying fuel to said burner, a handle for actuating said iron, a bracket for supporting said handle, a second bracket attached to the first named bracket to aid in supporting said reservoir, a non-heat conductor between said brackets, a piston located in said handle, whereby to force the fuel to said burner under pressure, and detachable pipes for connecting said handle and reservoir.

3. In a self-heating sad iron, a burner, means for supplying fuel to said burner, a handle of non-heat conducting material for actuating said iron, a U shaped bracket for supporting said handle, a second bracket attached to the U shaped bracket to aid in supporting said reservoir, a non-heat conductor between said brackets, a piston located in said handle, whereby to force the fuel to said burner under pressure, and detachable pipes for connecting said handle and reservoir.

4. In a self-heating sad iron, a burner, a reservoir for supplying fuel to said burner, a handle for actuating said iron, a U shaped bracket for supporting said handle, a second bracket attached to the U shaped bracket to aid in supporting said reservoir, a non-heat conductor between said brackets, a pump located in said handle, a piston disposed in said pump adapted to aid in creating a pressure in said reservoir, and pipes joined by a union coupler, whereby to unite said pump and reservoir in a removable manner.

5. In a self-heating sad iron, a burner, a reservoir for supplying fuel to said burner, a cylinder, pipes connecting said cylinder with said reservoir, a union coupler for uniting said pipes, a piston in said cylinder, a handle for reciprocating said piston, a handle disposed about said cylinder, whereby to actuate said sad iron, a U shaped bracket for supporting said handle, a second bracket attached to the U shaped bracket to aid in supporting said reservoir, and a non-heat conductor between said brackets.

In testimony whereof I have affixed my signature.

JOSEPH L. SCHMIDT.